US006801626B1

(12) United States Patent
Nambu

(10) Patent No.: US 6,801,626 B1
(45) Date of Patent: Oct. 5, 2004

(54) CRYPTOGRAPHIC KEY DISTRIBUTION USING LIGHT PULSES OF THREE MACROSCOPIC QUANTUM STATES

(75) Inventor: Yoshihiro Nambu, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/567,784

(22) Filed: May 9, 2000

(30) Foreign Application Priority Data

May 12, 1999 (JP) .......................................... 11-131983

(51) Int. Cl.[7] .............................................. G06F 17/00
(52) U.S. Cl. .......................... 380/256; 380/255; 380/41
(58) Field of Search ................................ 713/182–202; 380/255–256, 41, 258, 274, 277–286

(56) References Cited

U.S. PATENT DOCUMENTS

| 6,601,169 B2 | * 7/2003 | Wallace et al. ............. 713/168 |
| 6,601,170 B1 | * 7/2003 | Wallace ...................... 713/200 |
| 6,651,169 B1 | * 11/2003 | Benson et al. ............... 713/189 |

FOREIGN PATENT DOCUMENTS

| JP | 7-202880 | 8/1995 |
| JP | 2000-174747 | 6/2000 |

OTHER PUBLICATIONS

Crepeau, Cryptography in the quantum world, Information Theory and Networking Workshop, Jun. 27, 1999 –Jul. 1, 1999, p. 40.*
Townsend, Performance limits for first telecommunicatons window quantum cryptography systems, Integrated Optics and Optical Fibre Communications, 11th International Conference on, and 23rd European Conference on Optical Communications (Conf. Pulb. No.: 44.*

Franson, Quantum Communications, Quantum Electronics and Laser Science Conference, 2001, QELS '01, Technical Digest, Summaries of Papers Presented at the, May 6–11, 2001, p. 171.*
IEEE, New York, 1984, pp. 175–179.
Physical Review A, vol. 56, No. 2, pp. 1163–1172.
Physical Review Letters, vol. 67, No. 6, pp. 661–663.
Physical Review Letters, vol. 69, No. 9, pp. 1293–1295.
Physical Review Letters, vol. 81, No. 14, pp. 3018–3021.
Physical Review Letters, vol. 68, No. 21, pp. 3121–3124.
Physical Review A, vol. 50, No. 2, pp. 1047–1056.
Physical Review A, vol. 51, No. 3, pp. 1863–1869.
Optics Communications 123, pp. 344–352.
Journal of Modern Optics, 1993, vol. 40, No. 1, pp. 33–36.
Physical Review A, vol. 48, No. 1, R5–R8.

(List continued on next page.)

*Primary Examiner*—David Jung
(74) *Attorney, Agent, or Firm*—Dickstein Shapiro Morin & Oshinsky LLP

(57) ABSTRACT

At a sender site of a secure communication network, a first coherent light pulse sequence is phase modulated with a random bit sequence by a phase modulator, and a second coherent light pulse sequence synchronised to the first coherent light pulse sequence is transformed by an optical transducer to a superposition of coherent states. The outputs of the modulator and the transducer are multiplexed and transmitted over an optical communication link. At a receiver site, a homodyne detector receives the transmitted light pulse sequence and detects a random bit sequence and a superposition of quantum states. The homodyne detector may include a local light oscillator, phase control circuitry for controlling the local light source so that the local light oscillator produces first and second local light oscillations having a phase difference of 90 degrees therebetween, and a beamsplitter for receiving light from the optical communication link and mixing the first coherent light pulse sequence with the first local light oscillations and mixing the second coherent light pulse sequence with the second local light oscillation.

31 Claims, 6 Drawing Sheets

OTHER PUBLICATIONS

Journal of Modern Optics, 1993, vol. 40, No. 12, pp. 2501–2513.
Physical Review Letters, vol. 80, No. 14, pp. 3127–3140.
Physical Review A, vol. 54, No. 4 pp. 2728–2735.
Physical Review Letters, vol. 57, No. 1, pp. 13–16.
Physical Review Letters, vol. 58, No. 11, pp. 1055–1058.
Physical Review Letters, vol. 77, No. 24, pp. 4887–4890.
Physical Review A, vol. 31, No. 4, pp. 2403–2408.
Physical Review A, vol. 31, No. 2, pp. 1059–1066.
Japanese Office Action issued Dec. 2, 2003 (w/ English translation of relevant portion).

* cited by examiner

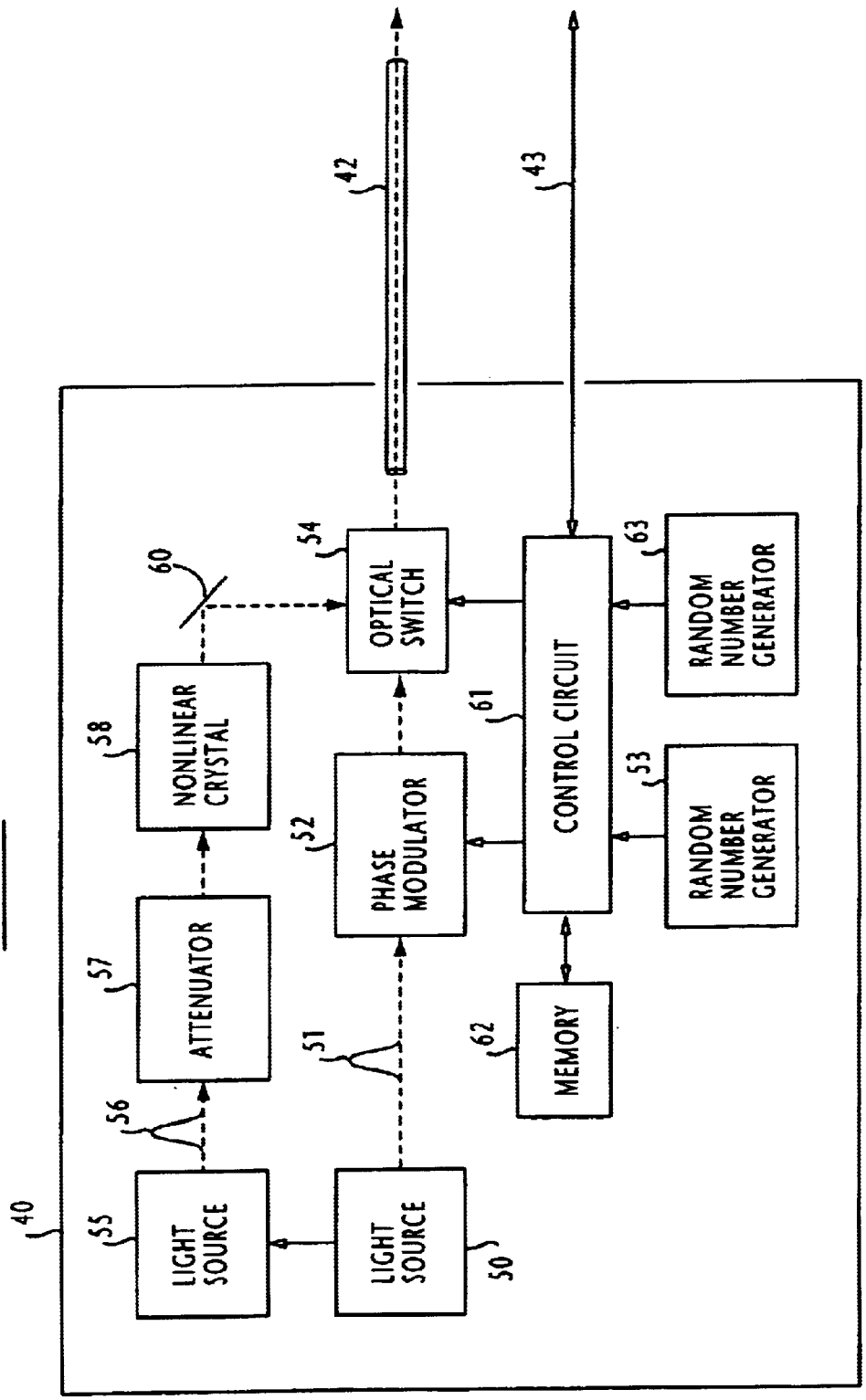

RECEIVER SITE

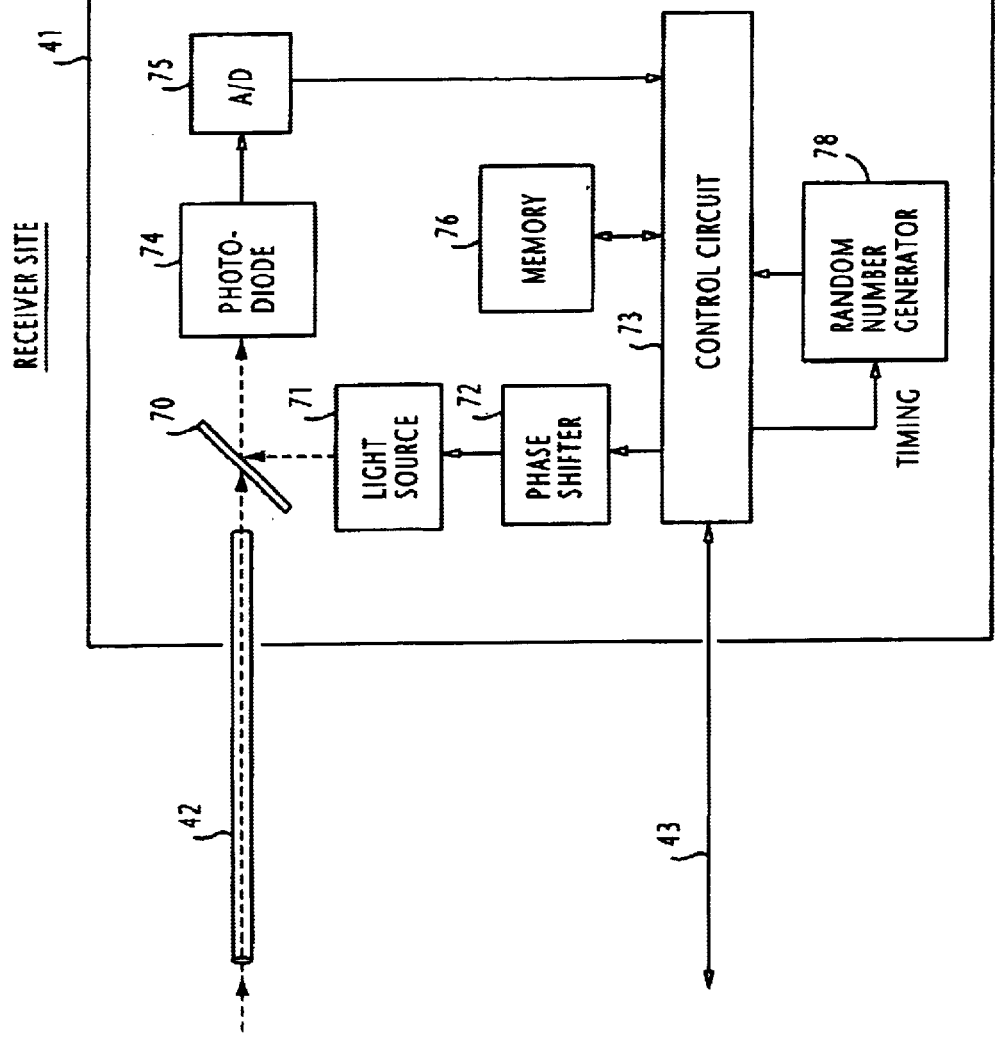

CRYPTOGRAPHIC KEY DISTRIBUTION USING LIGHT PULSES OF THREE MACROSCOPIC QUANTUM STATES

BACKGROUND OF THE INVENTION

1. Field of the Invention

The present invention relates generally to secure communication systems and more specifically to distributing key information using quantum cryptography which is unconditionally secure against eavesdropping.

2. Description of the Related Art

Quantum cryptography is known as the powerful technique for secure communication, because it provides unconditional security for distribution of secret key information between remote users. Quantum cryptographic key distribution consists of two parts: quantum information transmissions between legitimate users over a quantum channel and classical information transmission between the legitimate users over a public channel. Any activities of eavesdroppers are detected from the measured results of the two kinds of transmissions, which is ensured from the principles of quantum mechanics such as Heisenberg's uncertainty principle and violation of the Bell theorem. The protocol describes a process whereby the legitimate users determine a secret key while confirming that no eavesdropping is taking place. The security of the secret key is guaranteed by the uncertainty principle whereby disturbance is introduced in the quantum information by any eavesdropping attempt, and hence unconditional security against any wiretapping is achieved. By combining quantum cryptography With a one-time-pad scheme, an unconditional secure communication can be implemented.

A variety of protocols have been proposed so far, for example, the four-state scheme, the two-photon interferometric scheme, the nonorthogonal two-state scheme and the delayed interferometric transmission scheme. One measure of the performance of a protocol is the sensitivity to eavesdropping (specifically, it represents the precision of the amount of information leakage to an eavesdropper determined from the data bit error). Another measure is the data transmission rate which is determined by the reduction of data being discarded or sacrificed for detecting eavesdropping during the protocol. It has been found from the current study that the four-state quantum scheme and the two-photon interferometric scheme are better because of their high sensitivity to eavesdropping and high transmission rate.

The four-state scheme is the first one of the protocols invented. As described in Proceedings of the IEEE International Conference on Computers, Systems and Signal Processing, Bangalore, India (IEEE, New York, 1984), C. H. Bennet and G. Brassard, pages 175–179 (Reference 1), the four-state scheme (currently known as the BB84 protocol) uses a single-photon source 10 (see FIG. 1) to produce a pulsed photon carrier 11 for carrying one bit of information, a light modulator 12, an optical channel 13 for conveying the modulated photon carrier 11, and a public channel 16 (for which an eavesdropper can access, but cannot alter transmitted messages) for exchanging classical messages between two legitimate users at the sender and receiver sites to test the correlation of the data sent and those actually received. Light modulator 12 modulates the photon carrier 11 and encodes random bit sequence consisting of a bit "0" and a bit "1" produced from a controller 15 onto the photon carrier 11 so that bits "0" and "1" are encoded by two orthogonal polarisation states of a photon. Two nonorthogonal polarisation bases (oil is linear polarisations of 0° and 90° rectilinear basis, and the other is linear polarisations of 45° and 135°; diagonal basis) are used to encode the "0" and "1". Logical "0" and "1" are encoded with the 0° and 90° polarisations respectively (for rectilinear basis) and the 45° and 135° polarisations respectively (for diagonal basis). Circular polarisations (clockwise and counterclockwise) may be used, instead of one of these two polarisation bases (rectilinear basis or diagonal basis).

Since the 0° polarisations state and 90° polarisation state are orthogonal, photons with such polarisations can be reliably distinguished. A single measurement device 14 at the receiver site that has the ability to distinguish such polarisations is called a rectilinear measurement device. Likewise, photons with 45°–135° linear polarisation can he reliably distinguished by another single measurement device 14 that is called a diagonal measurement device. Quantum mechanical operator, having the eigenstates of rectilinear polarisation states and those having the eigenstate of diagonal basis are non-commuting. Thus, the rectilinear measurement device cannot distinguish the state of the photons which are in the eigenstate of diagonal basis and the diagonal measurement device cannot distinguish the state of the photons which are in the eigenstate of rectilinear basis (they will produce an error with a probability of ½). In particular, when a light pulse contains only one photon, these measurement devices cannot distinguish the state of the photons which are in the eigenstate of rectilinear basis and the state of the photons which are in the eigenstate diagonal basis at the same time (that is the uncertainty principle). The output of the measurement device 14 is supplied to a controller 17.

The basis (rectilinear basis or diagonal basis) are chosen at random at the sender site when encoding the bit onto the photon carrier. At the receiver site, the basis are also chosen at random independently of the sender site when decoding the modulated carrier. After transmissions of quantum information encoded in the photon carriers over the quantum channel 13, messages are exchanged over the public channel 16 between the controllers 15 and 17 to test whether both users used the same linear polarisation basis to transmit and receive the data. They discard the data that the legitimate users used a different basis to encode and decode the bit data. The bit value of the remaining data should agree for both legitimate users and are used to obtain the shared key data. An eavesdropper, having no means at all to match his/her polarisation basis to those chosen at the sender and receiver, inevitably produces an error in the shared bit sequence of the legitimate users when he/she attempts to measure the photons to eavesdrop the data. Several bits are then extracted from the shared bit sequence at each site and tested whether they agree by exchanging information over the public channel to determine if eavesdropping is taking place. If the extracted data agreed then the legitimate users find that there is no eavesdropping, and they produce a sequence of common random bits from the remaining data that were not used for this test and use these common random bits as a secret key.

The BB84 protocol is based on the uncertainty principle that in a single quantum system two sets of mutually nonorthogonal bases cannot he measured with certainty at the same time. A given orthogonal basis (e.g., the diagonal basis) can be always represented by a superposition of another basis nonorthogonal to it (e.g., the rectilinear basis). A measurement that can reliably distinguish a given basis would inevitably destroy the superposition state of a given basis (that is, nonorthogonal basis) and cause it to collapse to a given basis. More generally, a measurement that can partially distinguish a given basis would partially destroy the superposition state of given basis and the state after measurement approaches statistical mixture of a given basis.

It is shown in Physical Review Vol. A 56, No. 2, August 1997, Christopher A. Fuchs at al., pages 1163 to 1172 (hereinafter Reference 2) that the BB84 protocol is equivalent to a procedure in which the presence of an eavesdropper is detected through the collapse of quantum mechanical superposition. Reference 2 shows that the two-photon interferometric scheme is as strong as the four-state quantum cryptography. This two-photon interferometric scheme, known as the E91 protocol, uses the so-called Einstein-Podolsky-Rosen correlation, that is, non-local correlation in the non-separable quantum state of composite system, see Physical Review Letters Vol. 67, No. 6, August 1991, Artur K. Eckert, pages 661 to 663, (Reference 3), and Physical Review Letters Vol. 69, No. 9, August 1992, Artur K. Eckert, pages 1293 to 1295 (Reference 4). In addition, Physical Review Letters Vol. 81, No. 14, October 1998, Dagmar Bruss, pages 3018 to 3021, Reference 5, indicates that the security of quantum cryptography can be further increased by using a set of three different pairs of two orthogonal Basis states (i.e., a total of six states) for encoding the data.

As It has hitherto been believed that it is required that the measured system must be comprised by single quanta for a measurement with wrong basis to cause disturbance to a quantum mechanical superposition state. However, it is not a true requirement, but quantum mechanics allows the system to contain more than single quanta (photon) to be affected by the uncertainty principle. As will be described later, the present invention is based on the utilization of mesoscopic quantum mechanical states where the measured system, i.e. carriers, comprises multiple quanta or photons.

The two-state scheme, known as the B92 protocol, is described in Physical Review Letters Volume 68, Number 21, May 1992, Charier. H. Bennett, pages 3121 to 3124 (hereinafter Reference 6) and Physical Review Volume 30, Number 2, August 1994, A. K. Eckert, B. Huttner, G. M. Palma and A. Peres, pages 1047 to 1056 (hereinafter Reference 7). As shown in simplified form in FIG. 2, Reference 6 discloses an interferometric quantum key distribution scheme in which the sender site uses beam-splitter 22 to split a low-intensity coherent light pulse 21 into light pulses 23 and 24. The light pulse 23 is modulated by a phase modulator 25 so that information bits "0" and "1" are encoded into 0° and 180° phase shift, respectively. The modulated light pulse 23 is launched into one arm (quantum channel) 26 and the non-modulated light pulse 24 is launched into the other arm (quantum channel) 27 of a Mach-Zehnder interferometer. At the receiver site, the light pulses 23 and 24 are combined by beam-splitter 28 to cause interference. The phase difference between light pulses 23 and 24 is controlled by a phase modulator 29 so that the "0" bit pulses are delivered to a photodetector 30 and the "1" bit pulses are delivered to a photodetector 31. In order that the probability of light pulse 23 having two or more photons is as small as possible, the average number of photons contained in the low-intensity coherent light pulse 21 must be much smaller than 1 (0.1, for example). In this way, a prospect eavesdropper is prevented from copying a light pulse and the nonorthogonality (overlap) of the 0° and 180° phase shifted states of the light pulse 21 increases. Since the intensity of light pulse 21 is sufficiently dim to realize the two nonorthogonal quantum states, the contribution of vacuum state in the light pulse 21 necessarily increases.

Because of the large contribution of the vacuum state, it can be conclusively determine whether the light pulses incident on the photodetectors 30 and 31 are bits "0" and "1", respectively, although most of the time no photons are detected.

The B92 protocol relies on conclusive measurement of two nonorthogonal quantum states of this kind. According to the uncertainty principle, there exist no measurement that can unambiguously distinguish two nonorthogonal quantum states. Two nonorthogonal states can only be distinguished with a certain error probability. However, consider a measurement that allows three different outcomes to be gained from two nonorthogonal quantum states. If such a measurement is allowed, there exists a so-called unambiguous (conclusive) measurement that can give a unambiguous conclusion about some outcomes. For example, an measurement of two nonorthogonal quantum states A and B, three conclusions can be drawn in such a measurement: (i) state A cannot be true, (ii) state B cannot be true, and (iii) neither of these can be determined as true or false. If a given quantum state is none other than states A and B, these results are equivalent to the conclusions that (i) the state is unambiguously B, (ii) the state is unambiguously A, and (iii) neither of these can be determined. If conclusion (i) or (ii) is designated as "conclusive results" and conclusion (iii) as "inconclusive results", it is only necessary for the receiver to tell the sender the fact that the results are conclusive or inconclusive in order to share information about the state unambiguously. The contents of the conclusions (i) and (ii) are not transmitted, but shared by the sender and the receiver. However, there is no correlation between what data are conclusive results and what data are inconclusive results between the legitimate receiver and the eavesdropper. Thus it is impossible for the eavesdropper to share the same information with the legitimate sender and receiver. Therefore, an eavesdropper cannot tap a quantum channel without causing errors in the shared bit stream. The sender and the receiver extract test bits from the shared bit stream using a public channel to check for errors and determine if unauthorised interception has occurred. If it is ascertained that no eavesdropping has occurred, a secret key is determined from the remaining, untested bits. Since this protocol requires low-intensity coherent light, the receiver suffers from frequent instances of inconclusive results of measurement of quantum states, resulting in a low transmission speed.

Although the four-state scheme (the BB84 protocol) and the low-photon interferometric scheme (the E91 protocol) are highly secure and have high transmission rate, they need to use single-photon transmission in which each pulse contains only a single photon to ensure secure communication. This requires devices that can be precisely controlled to generate a single-photon sequence. However, no practical single-photon source is implemented with the current technology. In this regard, Physical Review Volume 51, Number 3, March 1995, B. Huttner, N. Gisin and T. Mor, pages 1863 to 1869 (Reference 8) and Optics Communications 123, 1996, Yi Mu et al., pages 344 to 352 (Reference 9) discuss a practical four-state quantum cryptographic key distribution system using a combination of two nonorthogonal quantum states to artificially create a four-states. However, it is also necessary to reduce the average number of photons sufficiently to ensure high security for these systems. This is achieved only at the cost of transmission rate.

SUMMARY OF THE INVENTION

It is therefore an object of the present invention to provide a key distribution system using four-state coherent light pulses comprised of multiple photons that is improved over prior art systems in terms of security and data transmission rate.

In general terms, the present invention provides a secure communication network comprising a sender node for randomly selecting, a first coherent light pulse sequence encoded with a random bit sequence and a second coherent light pulse sequence containing a superposition of two coherent states and transmitting the randomly selected first and second sequences over an optical communication link. A receiver node is connected to the optical communication link for receiving the randomly selected fist and second sequences. The receiver node determines whether or not the received second light pulse sequence is destroyed with the aid of exchanging the classical messages after quantum transmission that specifies which are the second sequences among total transmitted sequences, and produces a key from the received random bit sequence from the first light pulse sequence if the second light pulse sequence is found not destroyed by an unauthorised interception. It is the key point that the random bit sequence is encoded as a pair of orthogonal quantum states and detection of eavesdropping is carried by a superposition of these orthogonal quantum states. The first light pulse sequence in which the random hit is encoded may be two high-intensity nearly orthogonal coherent states, and the second light pulse sequence may the a superposition of two coherent states. This superposition of coherent states collapsed to one of coherent state by a measurement that can decode the random bit encoded in the first light pulse sequence. It is also collapsed even if a measurement is made at a single quantum level.

In further specific terms, the secure communication network of the present invention comprise, a first light source for producing a first coherent light pulse sequence, a phase modulator for modulating the first coherent light pulse sequence with a random bit sequence, a second light source synchronised in phase to the first light source for producing a second coherent light pulse sequence, an optical transducer for converting quantum states of the second coherent light pulse sequence to superposition of coherent states, an optical switch for switching outputs of the phase modulator and the optical transducer into a temporally mixed light pulse sequence and transmitting the mixed light pulse sequence over an optical communication link, and a homodyne detector for receiving the transmitted light pulse sequence via the optical communication link and detecting a random bit sequence and a superposition state.

The homodyne detector may include a local light oscillator, phase control circuitry for controlling the phase of the local light oscillator so that it produces first and second local light having a phase difference of 90 degrees therebetween, and a beam-splitter for receiving light from the optical communication link and mixing the first coherent light pulse sequence with the first local light and mixing the second coherent light pulse sequence with the second local light.

BRIEF DESCRIPTION OF THE DRAWINGS

The present invention will be described in further detail with reference to the accompanying drawings, in which:

FIG. 3A is a block diagram of a sender site of a quantum cryptographic communication network according to the present invention;

FIG. 3C is a block diagram of a receiver site of the quantum cryptographic communication network of the invention according to a second mode of operation.

DETAILED DESCRIPTION

Figure 1:
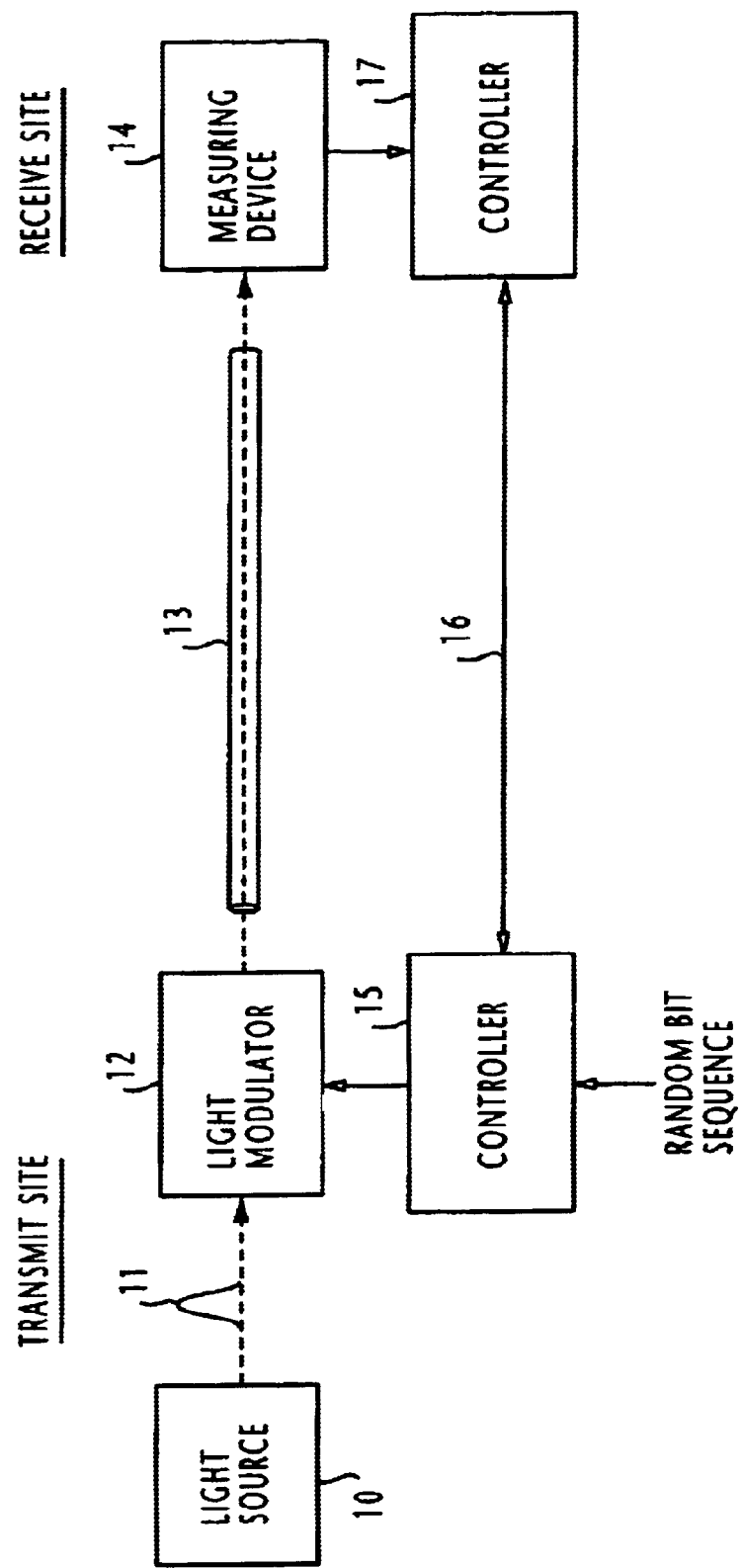
FIG. 1 is a block diagram of a prior art four-state quantum cryptographic communication network.
Figure 2:
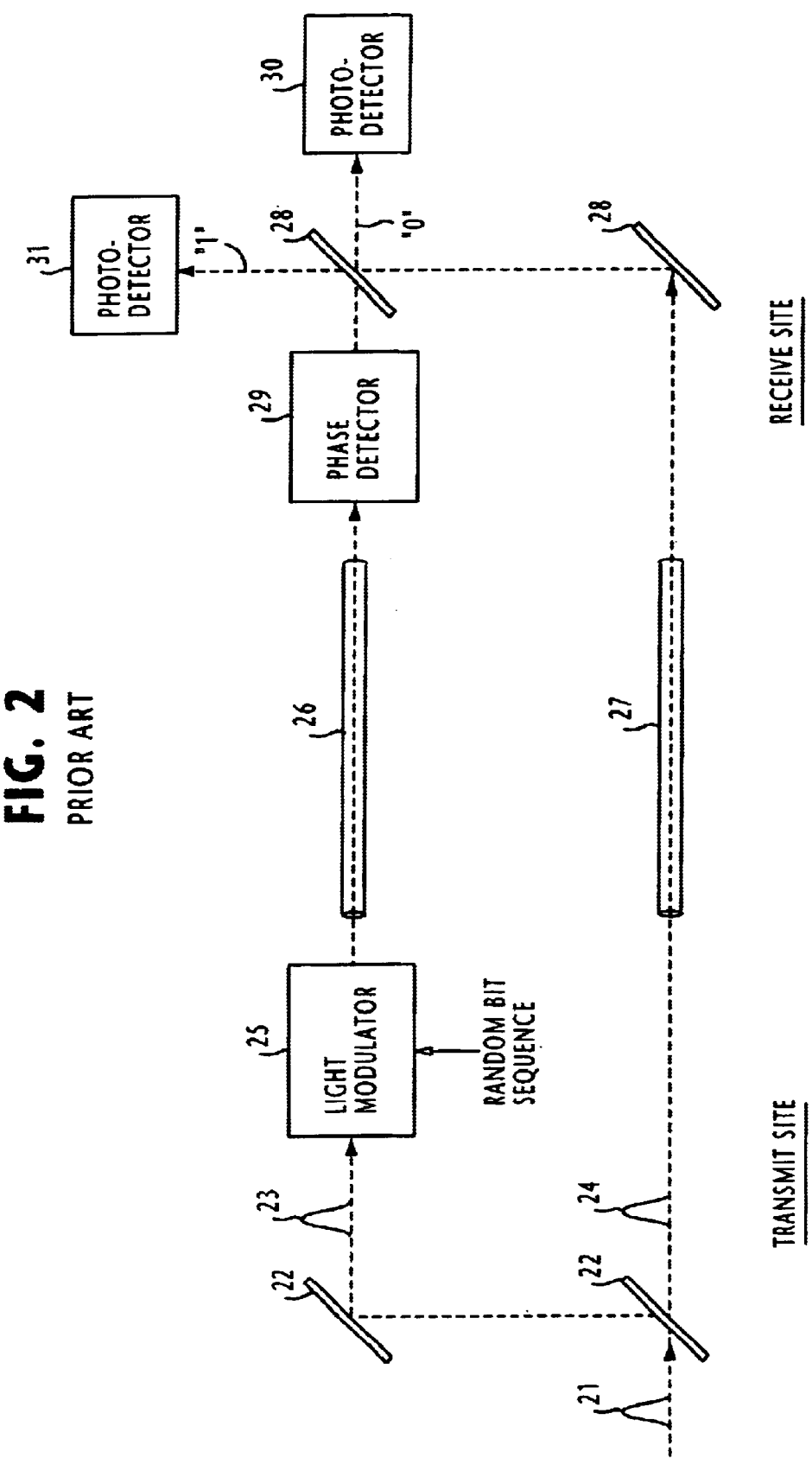
FIG. 2 is a block diagram of a prior art two-state quantum cryptographic communication network.

The present invention is based on the uncertainty principle which states that, in a single quantum system, an attempt to distinguish given orthogonal states, though imperfectly, at least partially destroys a superposition of a given orthogonal states (that is nonorthogonal to given states) and alters them into one of given orthogonal states (statistically mixed states). The key distribution system of the present invention can detect the presence of an eavesdropper by identifying whether the superposition state is collapsed or not.

According to Journal of Modern Optics, 1993, Vol. 40, No. 1. K. J. Blow et al., pages 33 to 36 (Reference 10), Physical Review Vol. 48, No. 1, July 1993, S. M. Barnett et al., pages R5 to R8 (Reference 11), Journal of Modern Optics, 1993, Vol 40, No 12, S. M. Barnett et al., pages 2501 to 2513 (Reference 12), Physical Review Letters, Vol. 80, No. 14, April 1998, T. Mor, pages 3137 to 3140 (Reference 13) and Japanese Laid-Open Patent Application 7-202880 (Reference 14), a quantum cryptographic protocol can be constructed from two orthogonal quantum states and a third quantum state that is non-orthogonal to the two orthogonal states. The two orthogonal states are used to transmit a random bit sequence to be shared by sender and receiver and the third quantum state is used to detect an eavesdropper.

According to the present invention, a sender alternately transmits to a receiver a high-intensity light pulse sequence containing nearly orthogonal, first and second coherent states and a light pulse sequence containing a superposition of first and second coherent states, as a third state. The receiver is synchronised to the sender to supply local light oscillation to a homodyne detector to detect the transmitted quantum states.

The conditions required for the receiver to detect the presence of an eavesdropper are:

a) A measurement made by an eavesdropper using a wrong basis is such that the superposition of quantum states is destroyed and evolves into one of the measured basis; and b) A superposition of quantum states must be destroyed by a measurement even at a single quantum level.

Potential eavesdroppers will devise, at all costs, a sophisticated strategy that attempts to leave no disturbance on tapped quantum States. In a situation where a given state of carrier involves multiple photons, and the encoded two states are known to the public by a protocol, it is theoretically possible for an eavesdropper to distinguish the given state by stealing at least one photon from a carrier pulse using a beamsplitter and leave no significant disturbance in the given state. The condition (b) is usually satisfied if the carrier pulse contains only one photon. In most cases, it has been considered that the state of a carrier pulse that satisfies the conditions (a) and (b) is the single photon state. However, quantum mechanics allows multiple photons to meet the conditions (a) and (b).

The present invention is characterised by the use of a quantum superposition of coherent states that satisfy the conditions (a) and (b) as a third nonorthogonal state to detect an eavesdropping. The quantum state of a coherent light pulse is expressed as $|\alpha\rangle$ according to the convention used in quantum mechanics, where $\alpha$ represents the complex amplitude. If the light pulse were subject to phase modulation of 0°, 90°, 180° and 270°, the modulated light pulse would alter its quantum state to $|\alpha\rangle$, $|i\alpha\rangle$, $|-\alpha\rangle$ and $|-i\alpha\rangle$, respectively.

Figure 3B:
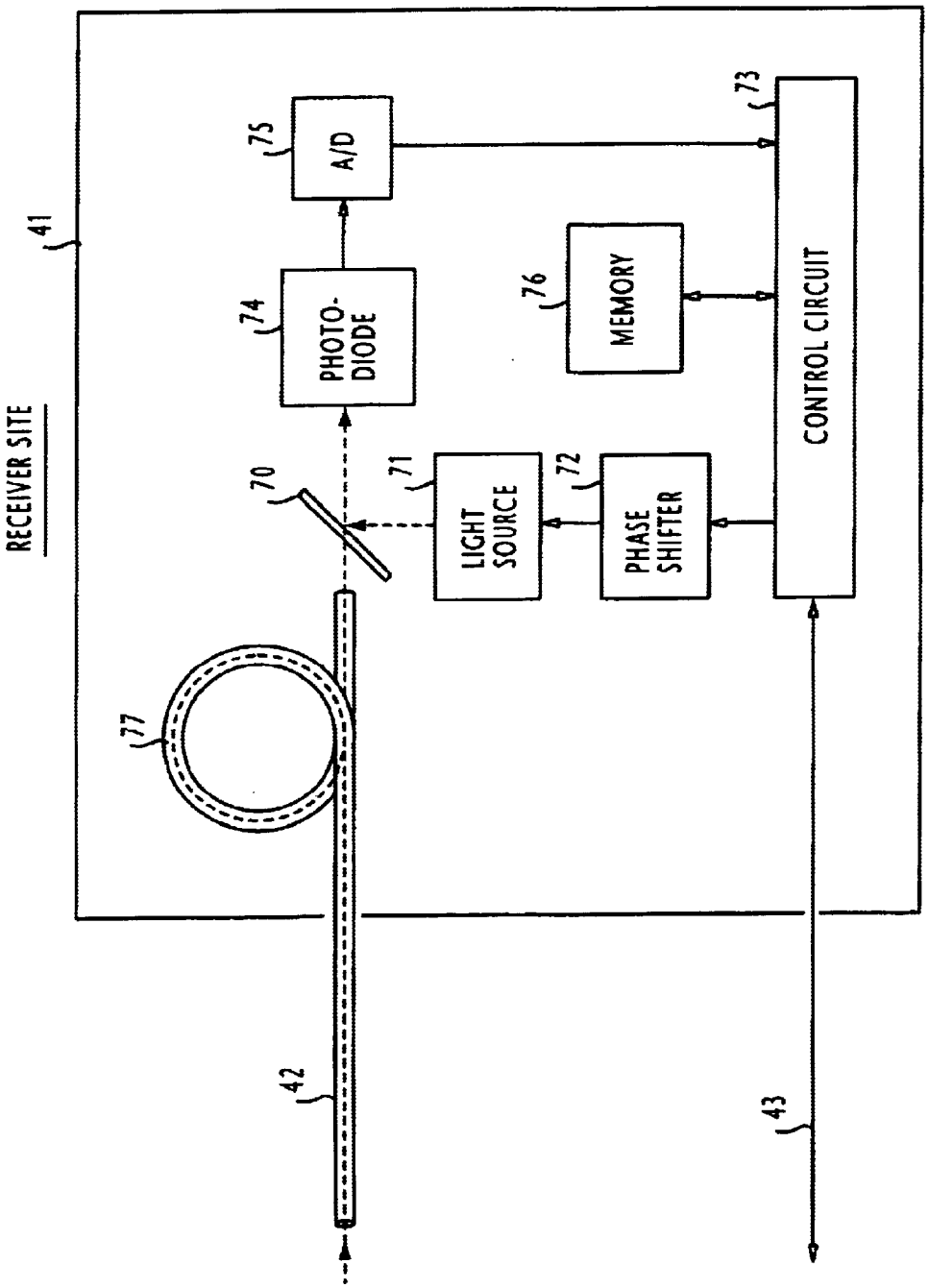
FIG. 3B is a block diagram of a receiver site of the quantum cryptographic communication network of the present invention according to a first mode of operation.

FIGS. 3A and 3B show a three-state quantum key distribution system of the present invention. The key distribution system of this invention comprises a sender site 40 (FIG. 3A) and a receiver site 41 (FIG. 3B) connected by an optical link 42 and a message (public) channel 43 which is used as a public communication shout the phase setting to be used for proper homodyne detection of the transmitted states as well as control for timing.

The sender site 40 includes a first coherent light source (oscillator) 50 for key distribution. Light source 50 is implemented with a semiconductor laser for producing a light pulse 51, which is incident on a phase modulator 52. Light pulse 51 is modulated (encoded) by modulator 52 in accordance with a random bit sequence supplied from a random number generator 53 via a control circuit 61. To produce a random bit sequence for key distribution, the average number of photons produced by light source 50 is nearly equal to 1. Phase modulator 52 modulates the light pulse 51 so that a bit "0" is encoded with phase delay 0° (= state $|\alpha\rangle$) and a bit "1" is encoded with phase delay 180° (= state $|-\alpha\rangle$). The output of the phase modulator 52 is coupled to an optical switch 54.

Among this light pulse sequence from the coherent light source 51, one-third contains zero photon, one-third contains a photon and one fifth contains two photons and one of every sixteen light pulses contains three photons in average. Homodyne (phase sensitive) detection is usually used to distinguish between the two coherent states $|\alpha\rangle$ and $|-\alpha\rangle$. If the amplitude $|\alpha|$ were near 1, the standard quantum limit (SQL) of error rate of distinguishing these coherent states would he about 2%. Note that the error rate can be reduced to 0.400 if an optimum receiver as discussed in Physical Review Vol. 54, No. 4, October 1996, M. Sasaki et al., pages 2728 to 2735 (Reference 15) is implemented. While the legitimate users at the sender and receiver sites cannot share perfect error-free bits even if no eavesdropping occurs (since one bit out of fifty bits is in error because of SQL), this bit error may be corrected by a classical error correction procedure. Furthermore, it is possible to reduce the bit error rate of optical homodyne detection to a value smaller than $10_{-9}$ by setting the average number of photons contained in the light pulse 51 to be greater than 10. Then, the sender and the receiver can share bits which substantially contain no errors.

For detecting eavesdropping, a quantum superposition of coherent states $|\alpha\rangle+|-\alpha\rangle$ are used. In order to produce a light pulse of such quantum superposition state, the sender site 40 has a second coherent light source 55. Light source 55 is implemented with a semiconductor laser which may be phase-synchronised to the light source 51 by light injection. A light pulse 56 from the light source 55 is incident on an attenuator 57 where the average number of incident light is adjusted to be same as that of the output from the light source 50. Note that if the average number of photon is much larger than 1, the superposition state tends to become easily collapsed due to optical losses encountered during transmission, lowering the sensitivity of eavesdropping.

The low-intensity light pulse from the attenuator 57 is then incident on a non-linear crystal 58 (such as BBO, KTP, LBO, $LiNO_3$). Crystal 58 transforms the incident light so that the coherent states $|\alpha\rangle$ of the incident light are superposed into a state ($|\alpha\rangle+|-\alpha\rangle$), known as the Schrodinger's cat state. For further information, see Physical Review Letters Vol 57, No. 1, July 1986, B. Yurke et al, pages 13 to 16 (Reference 16), Physical Review Letters Vol. 58., No. 11, March 1987, A. Mecozzi et al., pages 1055 to 1058 (Reference 17), and Physical Review Letters Vol. 77, No. 24, December 1996, M. Brune et al., pages 4887 to 4890 (Reference 18).

As described in Reference 16, the quantum superposition of coherent states has the following properties:

1) It can be determined by optical homodyne detection whether or not states of superposition are maintained.
2) Measurement setting on a first homodyne detector for distinguishing between coherent states $|\alpha\rangle$ and $|-\alpha\rangle$ are different from setting on a second homodyne detector for detecting superposition of coherent states $|\alpha\rangle+|-\alpha\rangle$. There is a phase difference of 90° between the local light oscillator of the first and second homodyne detectors.
3) If the first homodyne detector is used to detect a superposition of state $|\alpha\rangle+|-\alpha\rangle$, photon states evolve into state $|\alpha\rangle$ or state $|-\alpha\rangle$. This implies that a quantum superposition of coherent states is destroyed by a measurement using an incorrect phase setting for the local oscillator. This satisfies the property (1).
4) A superposition of coherent states can be fragile to an optical loss. A loss of only a single photon is sufficient to destroy a superposition of coherent states, as indicated in Reference 16 as well as in Physical Review Vol. 31, No. 4, April 1985, D. F. Walls et. al., pages 2403 to 2408 (Reference 19) and Physical Review Vol. 31, No. 2, February 1985, A. O. Caldeira et al., pages 1059 to 1066 (Reference 20). This indicates that a single photon carries sufficient information to identity states $|\alpha\rangle$ and $|-\alpha\rangle$. In principle, splitting even a single photon from a superposition of coherent state and detecting it make the state evolve into one of states $|\alpha\rangle$ and $|-\alpha\rangle$. This satisfies the condition (b) mentioned previously.

Returning to FIG. 3A, a coherent light pulse 59 of superposed states is directed from the non-linear optical element 58 and reflected off a mirror 60 to the optical switch 54, which is operated under control of the control circuit 61. Optical switch 54 randomly selects one of the output of (the first and second quantum states) the modulator 52 and the output of the non-linear crystal 58 according to a control signal supplied from a random number generator 63 via the control circuit 61, and forwards the selected optical signal to the quantum channel 42. As a result, two kinds of pulsed light sequences, one for key distribution and the other for detecting eavesdropping, are randomly multiplexed into a single pulsed light sequence and transmitted over the quantum channel 42 to the receiver site 41. The random bit sequence which has been used to encode the light pulse 51 is stored in a memory 62.

According to a first mode of operation, the control circuit 61, after quantum transmissions over the optical link 42, sends a measurement setting to the receiver site over the public channel 43 to inform it of the phase setting (local oscillator phase delay of 0°) appropriate for detecting the first and second quantum states, i.e., $|\alpha\rangle$ and $|\alpha\rangle$ and the phase setting (local oscillator phase delay of 90°) appropriate for detecting the third quantum state, i.e., $|\alpha\rangle+|-\alpha\rangle$.

In FIG. 3B, the optical delay line 77 is connected to the quantum channel 42 to receive and hold the transmitted quantum states until the measurement phase setting is received over the public channel 43. After passing through the delay line 77, the delayed optical signal is incident on a beam-splitter 70 where it is mixed with light from a local light source or oscillator 71. The phase delay of local light oscillator 71 is controlled by a phase shifter 72 to introduce a phase shift of 0° and 90° to the local oscillations in synchronism with the sender site so that the two components of the multiplexed optical signal are respectively mixed with local oscillations having a phase difference of 90° therebetween. To establish this synchronisation the receiving site 41 includes a control circuit 73 that receives a phase setting and timing signal supplied from the sender's control circuit 61 over the public channel 43 and controls the switch timing of the phase shifter 72.

Upon mixing with a local light oscillation at the beamsplitter 70, the quantum states of the multiplexed light pulse beam are determined. The mixed optical signal is incident on a photodiode detector 74 where the signal is converted to an electrical signal and applied to an analog-to-digital converter 75 where the magnitude of the signal is determined and converted to a binary signal. It is seen that a whole set of the beamsplitter 70, the local light oscillator 71, the phase shifter 72 and the photodiode detector 74 function as a homodyne detector.

The measurement setting message from the sender's control circuit 61 is received by the control circuit 73. In order for the homodyne detector to distinguish between the transmitted quantum states, the control circuit 73 controls the phase shifter 72 to introduce a stepwise phase shift of 0° and 90° according to the measurement setting message. Since the receiver site has possession of knowledge of the transmitted quantum states, they are properly distinguished. If the receiver site has no knowledge of such relationships in advance, one half of the transmitted quantum states would have to be discarded as stated below. Thus, the first mode of operation is advantageous in that it can achieve high transmission efficiency.

According to a second mode of operation, the sender's control circuit 61 transmits the measurement setting message after the receiver site has performed homodyne detection without the knowledge of quantum states transmitted by the sender site. In this case, the optical delay line. 77 is not used. Instead, the receiver node 42 includes a random number generator 78 as shown in FIG. 3C. Phase shifter 72 is controlled by the random number generator 79 via the control circuit 73 in order to randomly introduce a phase shifts of 0° and 90°. During quantum transmissions over the optical link 42, the control circuit 73 stores the digital output values of A/D converter 75 and the information about the phase setting for homodyne detection that were determined by the random number generator 78 in the memory 76. After the quantum transmissions, the receiver's control circuit 73 receives the measurement setting message over the public channel 43. Control circuit 73 utilises this measurement setting information to analyse the data stored in the memory 76 to discard data whose measurement setting do not coincide with the measurement setting specified by the measurement setting message. Since the receiver site has no knowledge of the measurement setting in advance to the homodyne detection, one half of the transmitted quantum states would have to be discarded.

The following is a detailed description of the homodyne detection of the present invention.

If $\phi$ denotes the synchronised phase of the sender's coherent light sources 50 and 55 and $\theta$ denotes the phase of the receiver's local light oscillator 71, the quantum states $|\alpha\rangle$ and $|-\alpha\rangle$ are distinguished with a high degree of certainty if $\cos(\phi+\theta)=1$ and the superposition states is distinguished with a high degree of certainty if $\sin(\phi+\theta)-1$.

There is a phase difference of 90° between the local light oscillators used for distinguishing the two kinds of optical signals.

More specifically, the homodyne detector performs a measurement using a condition "$\cos(\phi+\theta)=1$" to distinguish the two quantum states $|\alpha\rangle$ and $|-\alpha\rangle$ modulated by the phase modulator 52 at the sender site and the A/D converter 75 recovers the transmitted random bit sequence according to the usual zero-threshold decision strategy. This random bit sequence is supplied to the control circuit 73 and stored in a memory 76. Homodyne detector performs a measurement using a condition "$\sin(\phi+\theta)=1$" to rest whether the superposition of coherent states produced by the non-linear optical crystal 58 at the sender site is destroyed or not. The output A/D converter 75 which is derived from the superposition state are supplied to the control circuit 73 to check for eavesdropping.

Figure 4A:
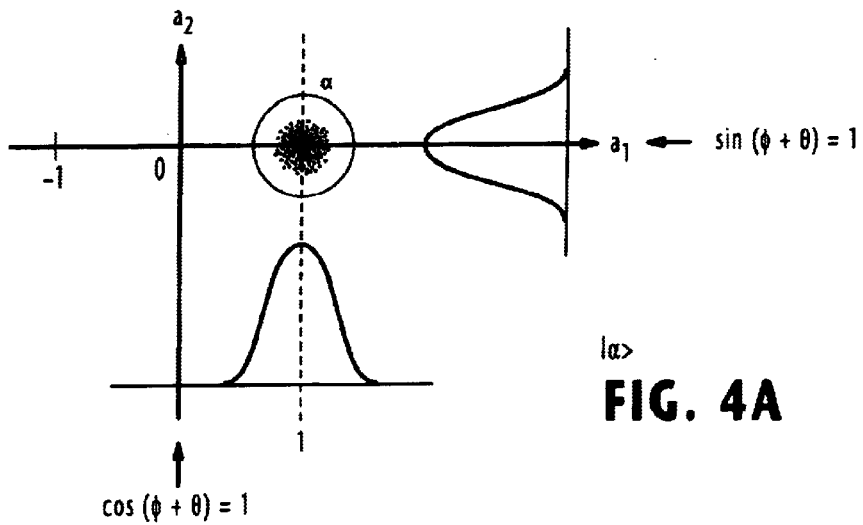
FIGS. 4A, 4B and 4C are graphic illustrations of probability distributions of signal detected by a legitimate receiver of the present invention.
Figure 4B:
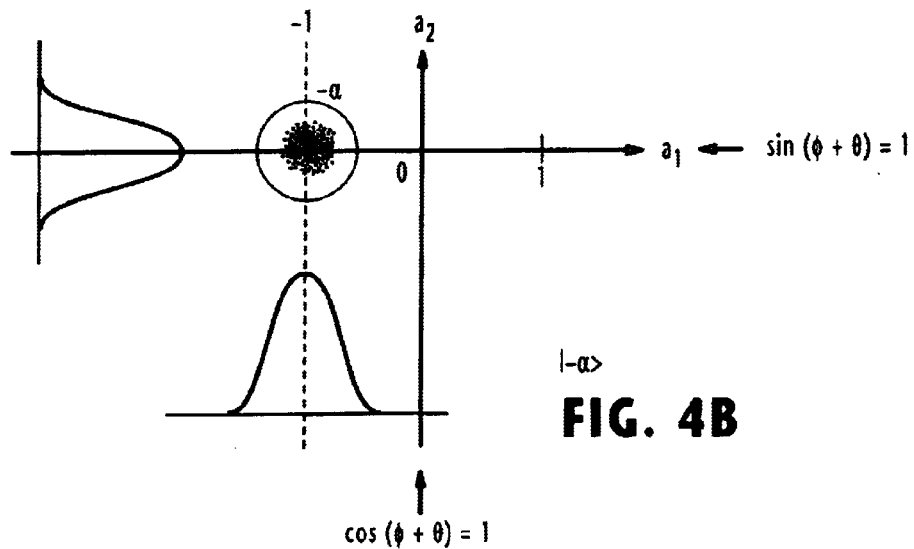
Figure 4C:
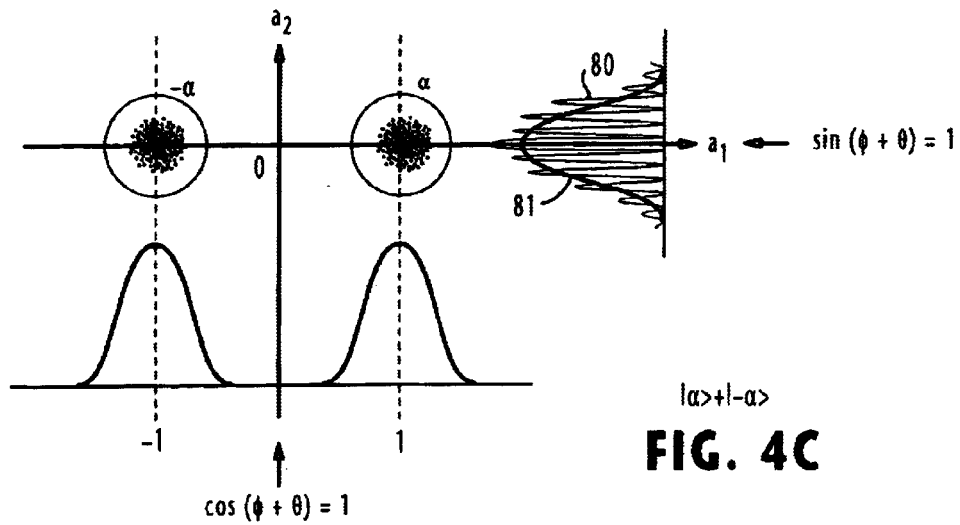

FIGS. 4A to 4C illustrate the probability distributions of two mutually orthogonal, normalised field quadrature amplitudes $(a_1, a_2)$ for the states $|\alpha\rangle$, $|-\rangle$ and superposition of states $|\alpha\rangle+|-\alpha\rangle$, respectively.

In FIG. 4A, the probability distribution of $(a_1, a_2)$ for state $|\alpha\rangle$ concentrate in a circle of radius ½ with its center located at point $(a_1=1, a_2=0)$, and the observation with the condition $\cos(\phi+\theta)=1$ is equivalent to observing the probability distribution of $a_1$ that is projected onto a plane $a_2=0$. If the state $|\alpha\rangle$ is transmitted, the expected probability distribution of the receiver's output is a Gaussian distribution with its peak at $a_1=1$. On the other hand, the observation with the condition $\sin(\phi+\theta)=1$ is equivalent to observing the probability distribution of $a_2$ that is projected onto a plane $a_11=0$, and the expected probability distribution for state $|\alpha\rangle$ is a Gaussian distribution with its peak at $a_2=0$.

FIG. 4B, the probability distribution of $(a_1, a_2)$ for states $|-\alpha\rangle$ concentrates in a circle of radius ½ with its center located at point $(a_1=-1, a_2=0)$ and the observation with the condition $\cos(\phi+\theta)-1$ is equivalent to observing the probability distribution of $a_1$ that is projected onto a plane $a_2=0$. If the state $|-\rangle$ is transmitted, the expected probability distribution is a Gaussian distribution having its peak at $a_1=-1$. The observation with the condition $\sin(\phi+\theta)=1$ for detecting state $|-\alpha\rangle$ is equivalent to observing its probability distribution on a plane $a_1=0$, and its expected probability distribution is a Gaussian distribution with its peak at $a_2=0$.

The legitimate receiver can recover the transmitted random bit sequence according to the usual zero-threshold decision strategy where the receiver obtains the bit value "0" when the electrical signal proportional to $a_1$ are negative and the bit value "1" when the electrical signal proportional to $a_1$ are positive.

As illustrated in FIG. 4C, when the transmitted signal is a superposition of stares $|\alpha\rangle|-\alpha\rangle$, two Gaussian distributions with peaks at $a_1=1$ and $a_1=-1$ can be observed when $\cos(\phi+0)=1$ is met, and a single Gaussian distribution with a peak at $a_1=0$ is observed when $\sin(\phi\div\theta)=1$ is satisfied. In the latter case, the Gaussian distribution has an interference fringe within its distribution.

As long as the superposition state is preserved, an interference fringe pattern is observed as illustrated in FIG. 4C. This interference fringe pattern disappears when the superposition state is destroyed by eavesdropping or optical loss, leaving a fringeless pattern of Gaussian distribution. Thus, the legitimate user at the receiving site can determine the presence of eavesdropping by observing the presence of an interference fringe and its visibility.

If eavesdropping has occurred during transmission, the superposition state are inevitably collapsed because the eavesdropper know no proper setting to measure each of the data, and the control circuit 73 detector an absence of an interference fringe pattern and alerts the sender's control circuit 61 to the fact that eavesdropping is taking place.

If eavesdropping is not detected, key distribution data stored in memory 76 is accepted. The legitimate sender and receiver are thus guaranteed to share a random bit sequence of the same bit pattern safely that is exclusively composed of orthogonal pairs of the first and second quantum states $|\alpha\rangle$ and $|-\alpha\rangle$ since this random bit sequence is only known to the legitimate users, it is determined as a common secret key.

What is claimed is:

1. A secure communication network comprising:
    a sender node for randomly selecting a first coherent light pulse sequence encoded with a random bit sequence and a second coherent light pulse sequence containing a superposition of quantum states and transmitting the randomly selected sequences of the first and second sequences over an optical communication link; and
    a receiver node connected to the optical communication link for receiving the randomly selected transmitted sequence,
    said receiver node determining whether or not the received second light pulse sequence is destroyed and producing a key from the received random bit sequence encoded in the first light pulse sequence if the second light pulse sequence is not destroyed by an unauthorised interception.

2. A secure communication network as claimed in claim 1, wherein said random bit sequence is encoded as a pair of nearly orthogonal coherent states.

3. A secure communication network as claimed in claim 1, wherein said superposition of quantum states is a superposition of coherent states.

4. A secure communication network as claimed in claim 1, wherein said superposition of quantum states can be collapsed by a measurement using an incorrect measurement setting and is further collapsed by a measurement at a single quantum level.

5. A secure communication network as claimed in claim 1, wherein said receiver node includes a homodyne detector for receiving the transmitted light pulse sequence and detecting a random bit sequence and a superposition of states.

6. A secure communication network as claimed in claim 5, wherein said homodyne detector includes:
    a local light oscillator;
    phase control circuitry for controlling said local light oscillator so that the local light oscillator produces first and second local light oscillations having a phase difference of 90 degrees therebetween; and
    a beamsplitter for receiving light from said optical communication link and mixing the first coherent light pulse sequence with said first local light oscillation and mixing the second coherent light pulse sequence with said second local light oscillation.

7. A secure communication network as claimed in claim 6, wherein said sender transmits a message over a message channel to said receiver node for indicating measurement setting appropriate for said first coherent light pulse sequence and said second coherent light pulse sequence, and said receiver node includes an optical delay line for receiving and holding the transmitted sequences until said message is received by the receiver node, and wherein said phase control circuitry is arranged to control said local light oscillator according to the measurement setting contained in the received message.

8. A secure communication network as claimed in claim 6, wherein said receiver node includes a random number generator, and wherein said phase control circuitry is arranged to control said local light oscillator according to a random number generated by the random number generator.

9. A secure communication network comprising:
    a first light source for producing a first coherent light pulse sequence;
    a phase modulator for modulating the first coherent light pulse sequence with a random bit sequence;
    a second light source synchronised in phase to the first light source for producing a second coherent light pulse sequence;
    an optical transducer for altering quantum states of the second coherent light pulse sequence to a superposition of coherent states;
    a random number generator;
    an optical switch for randomly multiplexing outputs of the phase modulator and the optical transducer according a random number produced by said random number generator into a multiplexed light pulse sequence and transmitting the multiplexed light pulse sequence over an optical communication link; and
    a homodyne detector for receiving the transmitted light pulse sequence via said optical communication link and detecting a random hit sequence and a superposition of quantum states.

10. A secure communication network as claimed in claim 9, wherein said phase modulator modulates the first coherent light pulse sequence so that said random bit sequence is encoded as a pair of nearly orthogonal coherent states.

11. A secure communication network as claimed in claim 9, wherein said superposition of quantum states can be collapsed by a measurement using an incorrect measurement setting and is further collapsed by a measurement at a single quantum level.

12. A secure communication network as claimed in claim 9, wherein said homodyne detector includes:
    a local light oscillator;
    phase control circuitry for controlling said local light oscillator so that the local light oscillator produces first and second local light oscillations having a phase difference of 90 degrees therebetween; and
    a beamsplitter for receiving light from said optical communication link and mixing the first coherent light pulse sequence with said first local light oscillation and mixing the second coherent light pulse sequence with said second local light oscillation.

13. A secure communication network as claimed in claim 9, further comprising:
    a first memory for storing said random hit sequence transmitted over said optical communication link;
    first control circuitry associated with said first memory;
    a second memory for storing the random bit sequence detected by said homodyne detector; and
    second control circuitry associated with said second memory, the second control circuitry being connected over a communication channel to the first control circuitry.

14. A secure communication network as claimed in claim 13, wherein said second control circuitry determines whether or not the superposition of quantum bases detected by said homodyne detector is destroyed.

15. A secure communication network as claimed in claim 12, wherein said first control circuitry transmits a message over a message channel to said second control circuitry for indicating measurement setting appropriate for said first coherent light pulse sequence and said second coherent light pulse sequence, further comprising an optical delay line for receiving and holding the transmitted multiplexed sequence until said message is received by the second control circuitry, and wherein said phase control circuitry is arranged to control said local light oscillator according to the measurement setting contained in the received message.

16. A secure communication network as claimed in claim 12, further comprising a random number generator, and wherein said phase control circuitry is arranged to control said local light oscillator according to a random number produced by the random number generator.

17. A method of distributing cryptographic key information comprising the steps of:
a) randomly selecting a first coherent light pulse sequence encode d with a randum bit sequence and a second coherent light pulse sequence containing a superposition of quantum states;
b) transmitting the randomly selected sequences over an optical communication link;
c) receiving the first coherent light pulse sequence and the second coherent light pulse sequence via said optical communication link;
d) determining whether or not the received second light pulse sequence is destroyed; and
e) producing a key from the received random bit sequence if the second light pulse sequence is not destroyed by an unauthorised interception.

18. A method as claimed in claim 17, wherein said random bit sequence is encoded as a pair of nearly orthogonal coherent states.

19. A method as claimed in claim 17, wherein said superposition of quantum states is a superposition of coherent states.

20. A method as claimed in claim 17, wherein said superposition of quantum states can be collapsed by a measurement using an incorrect measurement setting and is collapsible by a measurement at a single quantum level.

21. A method as claimed in claim 17, wherein the step (d) is a process of homodyne detection.

22. A method as claimed in claim 17, wherein the step (d) includes:
(d1) producing first and second local light oscillations having a phase difference of 90 degrees therebetween; and
(d2) mixing the received first coherent light pulse sequence with said first local light oscillation and mixing the received second coherent light pulse sequence with said second local light oscillation.

23. A method as claimed in claim 22, further comprising the steps of:
transmitting a message over a message channel for indicating measurement bases of said first coherent light pulse sequence and said second coherent light pulse sequence;
receiving the transmitted multiplexed sequence via the optical communication link and holding the received sequence in an optical delay line until said message is received via said message channel; and
wherein the step (d1) produces said first and second local light oscillations according to the measurement bases contained in the received message.

24. A method as claimed in claim 22, further comprising the step of generating a random number, and wherein the step (d1) produces said first and second local light oscillations according to said random number.

25. A method of distributing cryptographic key information comprising the steps of:
a) producing a first coherent light pulse sequence;
b) phase modulating the first coherent light pulse sequence with a random bit sequence;
c) producing a second coherent light pulse sequence synchronised in phase with said first coherent light pulse sequence;
d) transforming quantum states of the second coherent light pulse sequence to a superposition of quantum states;
e) randomly multiplexing the phase-modulated light pulse sequence and the transformed light pulse sequence and transmitting the randomly multiplexed light pulse sequences over an optical communication link;
f) receiving the transmitted light pulse sequences via said optical communication link; and
g) homodyne detecting a random bit sequence and a superposition of quantum states from the received light pulse sequences.

26. A method as claimed in claim 25, wherein the step (b) modulates the first coherent light pulse sequence so that said random bit sequence is encoded as a pair of nearly orthogonal coherent states.

27. A method as claimed in claim 25, wherein said superposition of quantum states can be collapsed by a measurement using an incorrect measurement setting and is further collapsible by a measurement at a single quantum level.

28. A method as claimed in claim 25, wherein the step (g) comprises the steps of:
(g1) producing first and second local light oscillations having a phase difference of 90 degrees therebetween; and
(g2) mixing the received first coherent light pulse sequence with said first local light oscillation and mixing the received second coherent light pulse sequence with said second local light oscillation.

29. A method as claimed in claim 25, further comprising the steps of:
storing said random bit sequence transmitted over said optical communication link in a first memory;
storing the random bit sequence detected by the step (g) in a second memory; and
determining whether or not the superposition of quantum states detected by the step (g) is destroyed; and
comparing the random bit sequence stored in the first memory and the random bit sequence stored in the second memory for producing a key if said superposition is not destroyed.

30. A method as claimed in claim 28, further comprising the steps of:
transmitting a message over a message channel for indicating measurement bases of said first coherent light pulse sequence and said second coherent light pulse sequence;
receiving the transmitted multiplexed sequence via the optical communication link and holding the received sequence in an optical delay line until said message is received via said message channel; and
wherein the step (g1) produces said first and second local light oscillations according to the measurement bases contained in the received message.

31. A method as claimed in claim 28, further comprising the step of generating a random number, and wherein the step (g1) produces said first and second local light oscillations according to the random number.

* * * * *